July 18, 1961  F. LEIGHTON ET AL  2,992,630
AUXILIARY SPRING POWERED SAFETY ACTUATOR FOR
BRAKES OF THE FLUID OPERATED TYPE
Filed May 16, 1960

INVENTOR.
FRANCIS LEIGHTON
ALBERT D. HERMAN
BY
ATTORNEY

United States Patent Office 2,992,630
Patented July 18, 1961

2,992,630
AUXILIARY SPRING POWERED SAFETY ACTUATOR FOR BRAKES OF THE FLUID OPERATED TYPE

Francis Leighton and Albert Dale Herman, Encino, Calif., assignors, by mesne assignments, to Hydro-Aire Company, a division of Crane Co., a corporation of Illinois
Filed May 16, 1960, Ser. No. 29,365
8 Claims. (Cl. 121—38)

This invention relates generally to brake actuating systems of the fluid operated type and in particular to air brake systems for automotive vehicles such as highway trucks, trailers, tractor-truck combinations etc.

The general object of the invention is to provide a spring powered auxiliary actuator in operative association with a conventional fluid-powered brake actuator, adapted to become operative to set the brakes in the event of failure of fluid pressure in the system.

Specifically, the invention contemplates an auxiliary spring powered actuator unit associated directly with a respective pneumatic actuator for a respective individual wheel brake, in a system wherein the fluid pressure in the service line for the pneumatic actuators is applied to each of the auxiliary actuators in a manner to maintain them inoperative so long as ample fluid pressure for operation of the brakes exists in the system. The auxiliary actuator accordingly embodies a cylinder which is attached directly to the end cap of the conventional actuator and which defines with the diaphragm, thereof, a fluid chamber into which fluid under pressure is injected so as to move the diaphragm in a direction to transmit pressure through a push rod to the brake for actuating the same. The auxiliary actuator also embodies a piston, sliding in its cylinder and having a stem which passes through a sealed aperture in the end cap of the main actuator, for transmitting pressure to the diaphragm for auxiliary actuation when pressure fails in the air pressure supply line of the system. The auxiliary pressure is developed by a series of coil springs engaged under compression between the piston and a cap on the rear end of the cylinder.

Actuators of this general type have been hitherto proposed but have not been accepted commercially because of a number of unsatisfactory characteristics therein. The general object of the present invention is to provide improvements in this type of actuator, such as to make it suitable for commercial use.

A specific object is to provide, in such an actuator, means for retaining in assembly, the piston, stem, loading springs and rear end cap of the auxiliary actuator during servicing operations wherein the piston and spring assembly is removed from the cylinder; the retaining means being such as to limit the separation of the piston from the rear end cap sufficiently to unload the spring reaction pressure from the cylinder and permit the securing elements which normally attach the rear end cap to the cylinder, to be removed free of any shear loads between the cylinder and cap, to avoid any sudden rearward propulsive action on the cap by the springs when the securing elements are removed, and to permit the cap to be recoupled to the rear end of the cylinder without requiring the application of pressure thereto to compress the actuator springs.

Other objects and advantages will become apparent in the ensuing specifications and appended drawing in which.

Figures 1, 2:
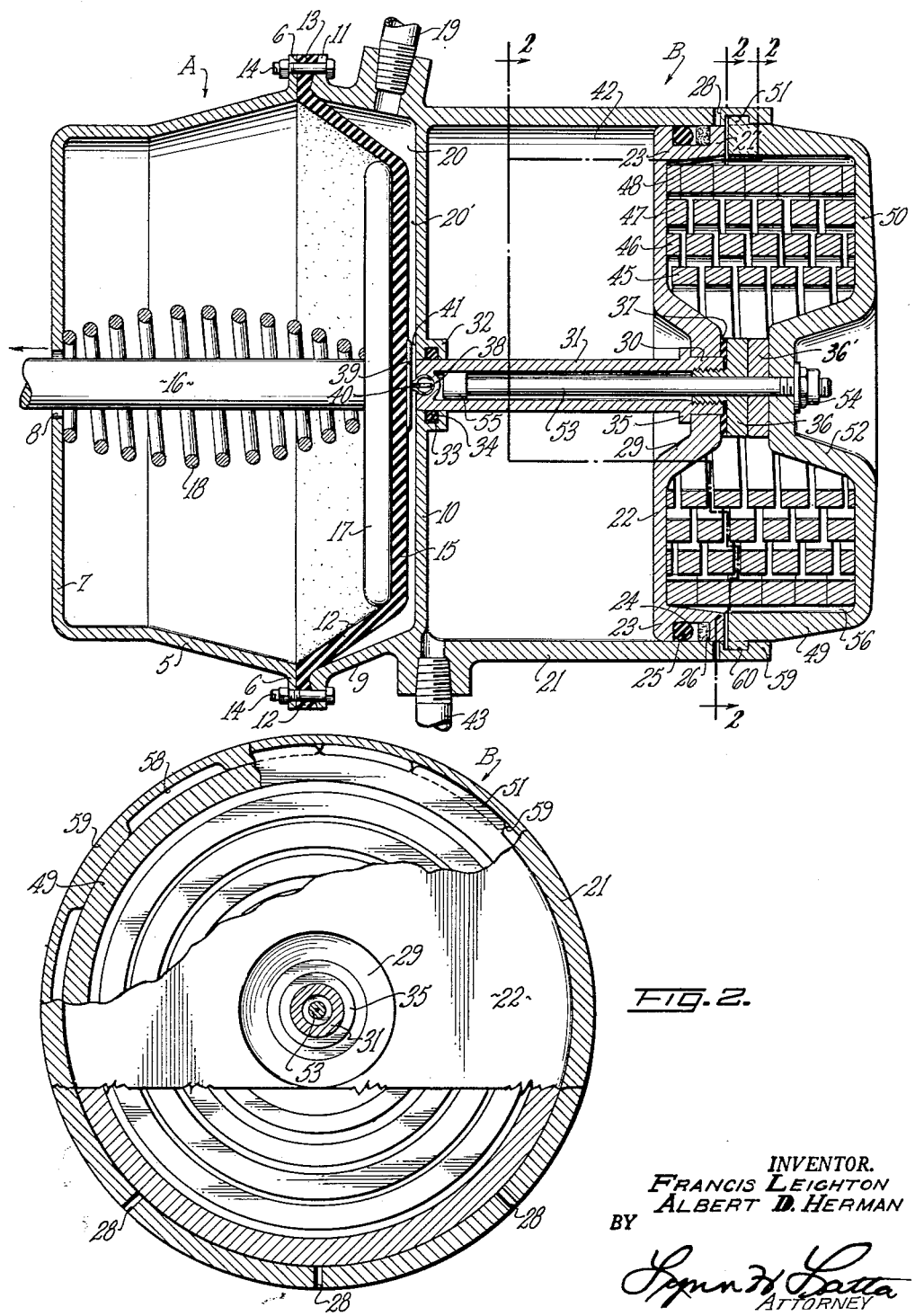
FIG. 1 is an axial sectional view of a combined fluid actuator and auxiliary spring powered actuator unit embodying our invention.
FIG. 2 is a transverse sectional view thereof taken on the line 2—2 of FIG. 1.

Referring now to the drawings in detail, we have shown therein, as an example of one form in which our invention may be embodied, an actuator unit comprising a conventional fluid powered (air brake) actuator indicated generally at A and an auxiliary spring powered actuator unit indicated generally at B.

Detailed description

*Conventional actuator unit.*—The unit A has a main housing section 5 of conventional design, with a peripheral flange 6, and a forward end wall 7 having a central aperture 8; a diaphragm cap including a rim portion 9 and an end wall 10 which constitutes a bulkhead separating the units A and B, and having a peripheral flange 11 opposed to the flange 6; a diaphragm 12 having a peripheral portion 13 clamped between flanges 6 and 11 by bolts 14 and having a flat central portion 15; a brake actuator rod 16 having a flat head 17 bearing against the flat central portion 15 of the diaphragm; a return spring 18 under compression between the forward end wall 7 and the head 17, for returning the diaphragm to the position shown in FIG. 1 in which it is closely adjacent and parallel to bulkhead 10; and a connection 19 to the service line through which air under pressure for normal operation of the brakes, is injected into the brake operating fluid pressure chamber 20, 20′ defined between diaphragm 15 and bulkhead 10.

*Auxiliary actuator unit B.*—Formed integrally with the diaphragm cap 9, 10 is a cylinder 21 in which is slidably mounted an auxiliary actuator piston 22. Piston 22 has a rim 23 provided with a wide cylindrical peripheral recess 24 cooperating with the inner wall of cylinder 21 to define a cylindrical ring chamber in which is mounted an O-ring seal 25 and a lubricating packing ring 26. The rearward flange 27 of rim 23 is normally positioned in covering relation to a series of bleed apertures 28 in the cylinder 21, so as to seal the interior of the cylinder against the entry of dust and other foreign matter.

The piston 22 has a crowned central portion 29 defining an internal recess. Mounted in a flat end wall portion of the crowned central portion 29 is a cylindrical shank 30 of a tubular piston stem 31 which projects forwardly into a cylindrical aperture in a boss 32 which is an integral central portion of bulkhead 10. In boss 32 is an annular internal groove 33 in which is mounted an O-ring seal 34 in constricting sealing engagement with the cylindrical external surface of stem 31. Adjacent the shank 30, stem 31 has an integral flange 35, which abuts the central part of piston 22. A flanged nut 36 is threaded into the shank 30 and is clamped against the outer end face of crowned central piston part 29, with a packing washer 37 interposed.

The forward end of stem 31 is closed by an integral end member having a spherical socket 38. A pressure pad 39, in the form of a thin flat circular disc, is disposed in unattached contact with the rear face of diaphragm 15. Pressure pad 39 is provided on its rear side with a generally spherical array of spring fingers 40 which are engaged in socket 38 with a snap-fastener action which provides a universally pivotal attachment between the forward end of stem 31 and the pressure pad 39. A flat narrow space 41 is defined between the rear surface of pressure pad 39 and the forward face of bulkhead 10, thus accommodating the slight deflections of bulkhead 10 which may take place in response to changes in fluid pressure acting on the bulkhead, and also accommodating self-alignment of pad 39 to the surface of diaphragm 15.

Defined between piston 22 and bulkhead 10 is a retractor chamber 42 which is connected by a suitable fluid connection 43 to the same service line which supplies fluid pressure through connection 19 to the actuator chamber 20. The chamber 42 is sealed by the O-ring 34 against the loss of pressure therefrom. So long as adequate pressure exists in the system, it will be applied in the chamber 42 to the forward side of piston 22, maintaining the piston and stem 31 in the retracted position shown in FIG. 1.

From this retracted position, the piston 22 and stem 31 are adapted to be projected forwardly by the stored energy of a series of coil springs 45, 46, 47 and 48 of progressively greater diameter, disposed in concentric array between the piston 22 and the flat rear end wall 50 of a rear end cap 49 which is secured within the rear end of cylinder by a bayonet coupling comprising circumferentially spaced, radially projecting lugs 51 on the rim of cap 49, adapted to pass axially through notches 58 defined between radially inwardly projecting lugs 59, into an annular recess 60 in the rear end of cylinder 21, and to lock behind the lugs 59 as indicated. Springs 45–48 are contained within a chamber 56 defined between piston 22 and rear end cap 49. Cap 50 has a re-entrant central portion 52 in which is mounted the threaded rear end of a tie rod 53 secured by a nut 54 threaded thereon. Tie rod 53 extends through a bore in the nut 36 and into the tubular stem 31 and has at its forward end a head 55 which is slidably fitted to the internal wall of the stem 31.

Bleed apertures 28 are located so as to be closed by packing ring 26 when the piston is in its retracted position. The packing ring 26 then cooperates with the apertures 28 to provide a valve which closes the cylinder.

*Operation*

In the normal operation of the unit, with adequate pressure existing in the system, the operating pressure applied through connection 43 in chamber 42 will retain the piston 22 retracted and the springs 45–48 compressed. In the retracted position, the spring 48 is fully compressed with its adjoining turns in contact with one another and supports the piston 22 in the retracted position, taking the load imposed by the pressure within chamber 42. Additional support, for the center of the piston, may be provided by a spacer washer 36' on tie rod 53 between the head of nut 36 and the reentrant central section 52 of the rear end cap 50.

In normal braking operation, air pressure is admitted through connection 19 (under the control of a suitable brake pedal operated valve) into the pneumatic actuator chamber 20 and reacts between the bulkhead 10 and the diaphragm 15 to move the diaphragm forwardly, applying pressure through head 17 to the brake operating rod 16 and projecting it forwardly through the aperture 8 to actuate the brakes. The diaphragm will separate from the pressure pad 39 which will remain supported by the forward end of stem 31. When the pressure on the brake pedal is relieved, the pressure in chamber 20 will be allowed to escape through the connection 19 and return spring 18 will move the actuator rod 16 and diaphragm 15 to their normal position shown in FIG. 1.

The rim portion of diaphragm 12 is contoured to leave a flaring annular space between it and the rim of diaphragm cap 9, this flaring space functioning to rapidly distribute the air from connection 19 to the space 20', of substantial depth, defined between the rear face of diaphragm 15 and bulkhead 10, and thus resulting in quick response of the diaphragm to the pressure fluid injected into the chamber 20.

Chamber 42 is always in communication with the pressure in the service line and so long as the pressure is at a normally high level, the auxiliary actuator will be fully retracted. However, when the pressure in the service line fails, pressure in chamber 42 will correspondingly drop, permitting the piston 22 to advance under the push of springs 45–48. The pad 41, pivotally connected to the forward end of stem 31, will adjust itself automatically to full contact with the diaphragm 15 such as to evenly distribute pressure of the stem 31 to the entire area contacted by the pad. The spring pressure will be transmitted from the stem 31 through the pad 39 to the diaphragm and thus to the head 17 and brake actuator rod 16, actuating the brakes by spring pressure which is sufficiently high to readily overcome the resistance of return spring 18 and to set the brakes.

When moisture condenses in the cylinder 21 (as by the expansion of the spring chamber 56 during an auxiliary spring powered actuation) the bleed ports 28 will be uncovered and upon return movement of piston 22 after the leak in the service line has been repaired and pressure restored, such condensate will be swept rearwardly to the bleed ports 28 and thence through these ports to atmosphere. As the piston 22 assumes its fully retracted position, the ports will again be covered to exclude dust etc. The ports 28 also function to provide a breathing action so that the forward projection of piston 22 under spring power will not be resisted by vacuum in the spring chamber 56.

When it becomes necessary to open up the actuator cylinder by removing the rear end cap 49, the pressure is first bled from the chamber 42 allowing the piston 22 to advance to brake actuating position. At this position, the forward end of nut 36 will engage against the annular shoulder defined by the rear end of head 55 and further spreading movement between piston 22 and rear end cap 49 will thus be arrested. The parts are adjusted so that the limitation of movement will not interfere with full brake application. The cap 49 can then be rotated to unlock the bayonet coupling, and then removed, without being subjected to shear forces acting between the cap 49 and cylinder 21, since the spring load is now carried by the stem 53 and there is no spring load on cylinder 21. As the cap 49 is uncoupled, completely releasing the attachment between the cap and cylinder 21, the cap will be supported by the stem 53 so as to avoid any rearward projection of the cap by the action of the still loaded springs. The assembly of cap 49 and piston 22, firmly maintained in coaxial relation with the piston 22 and cap 49 spread apart to their maximum separation, can then be freely moved rearwardly to separate it from the cylinder 21, and any necessary servicing operations can then be performed. When servicing is completed, the assembly of cap, piston and springs, still maintained in coaxial alignment by the spring loaded separation of the cap and piston and the opposing tying action of tie rod 53, can be inserted back into the cylinder 21, the piston guiding the rim of cap 49 into the end of the cylinder, and by registering the tapped openings in rim 50 with the openings in cylinder 21 the lugs 51 can be inserted through notches 58 between the cylinder lugs 59 until the forward end of cap 49 bottoms against the annular shoulder defining the forward side of annular recess 60 in cylinder 21, and by then rotating the cap 49 circumferentially a distance corresponding approximately to the length of one of the lugs 51, the lugs 51 will be locked behind the lugs 59 of the cylinder to secure the cap in place. Subsequently, when normal air pressure is re-introduced into the chamber 42 through connection 43, the full loading of the completely compressed springs will be imposed between the lugs 51 and 59, thus securely locking the cap 49 against retrograde rotation in response to vibration, such as might otherwise cause release of the lugs 51 from the lugs 59. This provides another advantageous feature of the invention, wherein the auxiliary actuator springs serve not only their primary function of auxiliary actuation but also the secondary function of cooperating with the bayonet coupling lugs to maintain the bayonet coupling locked against accidental unlocking.

We claim:

1. An auxiliary spring-powered emergency actuator for a pneumatic brake actuator of the type comprising a diaphragm clamped between a housing and an end cap, and defining with said end cap a diaphragm actuator chamber, a brake actuator push rod extending through a central aperture in the housing and having a head bearing against said diaphragm, said auxiliary actuator comprising: a cylinder integral with said end cap and projecting rearwardly therefrom in coaxial, opposed relation to said housing; a piston slidable in said cylinder; a bulkhead, constituted by the central portion of said end cap, cooperating with said piston and cylinder to define a piston retracting pressure chamber and separating the latter from said diaphragm actuator chamber, said bulkhead having means defining a central aperture; a tubular piston stem having a rear end secured to said piston and a forward end projecting into said aperture for transmitting pressure to the center of said diaphragm; a rear end cap secured to the rear end of said cylinder in opposed relation to said piston; compression spring means engaged under compression between said piston and said rear end cap; means for admitting to said piston retracting pressure chamber, the air pressure utilized in actuating said diaphragm, for moving said piston to a retracted position in which said spring means is compressed; a tie rod having a rear end secured to the center of said rear end cap, said tie rod extending through the piston and into said tubular stem and having a head at its forward end; and means within said one end of said stem providing an abutment against which said tie rod head will engage to limit the separation of said piston and rear end cap under the expansive force of said spring means when said air pressure is released from said piston retracting pressure chamber.

2. An actuator as defined in claim 1, wherein said spring means comprises a plurality of coil springs of progressively larger diameter arranged coaxially in encircling relation to one another, and wherein at least one of said springs is compressed to fully closed condition in the fully retracted position of the piston.

3. An actuator as defined in claim 1, wherein said abutment is in the form of an annular shoulder.

4. An actuator as defined in claim 1, including a nut having a tubular part threaded into the rear end of said stem and providing said annular abutment means at its forward end, said tie rod extending axially through said nut.

5. An actuator as defined in claim 1, wherein said tubular stem has an open rear end defined by an internally threaded cylindrical shank projecting through a cylindrical bore in the center of said piston, and has an annular shoulder flange at the base of said shank, bearing against the forward side of said piston; and further including a nut having an externally threaded tubular part threaded into said shank and a radial head for exerting clamping pressure against the rear side of said piston to secure the stem thereto; said tie rod passing through said nut.

6. A spring-powered auxiliary actuator for a pneumatic brake actuator of the type including a diaphragm and an end cap cooperatively defining an air brake chamber, and a brake actuator push rod engaged by said diaphragm and extending forwardly therefrom for brake actuation when said diaphragm responsd to air pressure in said chamber, said auxiliary actuator comprising: a cylinder secured to said end cap and projecting rearwardly therefrom; a piston slidable in said cylinder, said end cap comprising a bulkhead cooperating with said piston and cylinder to define a piston-retracting pressure chamber and separating the latter from said diaphragm-actuator chamber, said bulkhead having means defining a central aperture; a tubular piston stem having a rear end secured to said piston and a forward end projecting into said aperture for transmitting pressure to the center of the diaphragm; said cylinder having a rear end member in opposed relation to said piston; compression spring means engaged under compression between said piston and said rear end member; means for admitting air under pressure to said piston retracting chamber for retracting said piston and compressing said springs; a tie rod having a rear end portion secured to said rear end member, extending into said tubular stem and having a head at its forward end; an abutment means near the rear end of said stem, engageable with said tie rod head to limit the forward movement of said piston away from said rear end member under the expansive force of said spring means when air pressure is released from said piston-retracting chamber.

7. An auxiliary spring powered actuator as defined in claim 6, wherein said tie rod has its rear end threaded through said rear end cap and projecting therefrom, and including a lock nut threaded on the projecting portion of said threaded rear end and locking the tie rod to the rear end cap.

8. An auxiliary spring powered actuator as defined in claim 6, said rear end cap and the rear end of said cylinder having cooperating bayonet coupler means providing for the attachment of the cap to the cylinder, said compression spring means loading said bayonet coupling means to maintain their coupling engagement, resisting accidental uncoupling from the effect of vibration.

References Cited in the file of this patent

UNITED STATES PATENTS

| | | |
|---|---|---|
| 2,754,805 | Beman | July 17, 1956 |
| 2,854,954 | Howze | Oct. 7, 1958 |

UNITED STATES PATENT OFFICE

CERTIFICATE OF CORRECTION

Patent No. 2,992,630                                                  July 18, 1961

Francis Leighton et al.

It is hereby certified that error appears in the above numbered patent requiring correction and that the said Letters Patent should read as corrected below.

Column 6, line 6, for "responsd" read -- responds --; line 22, for "spfings" read -- spring means --; lines 33, 36, and 38, for "cap", each occurrence, read -- member --; line 40, for "cap" read -- rear end member --.

Signed and sealed this 23rd day of January 1962.

(SEAL)
Attest:

ERNEST W. SWIDER
Attesting Officer

DAVID L. LADD
Commissioner of Patents

Notice of Adverse Decision in Interference

In Interference No. 92,436 involving Patent No. 2,992,630, F. Leighton and A. D. Herman, Auxiliary spring powered safety actuator for brakes of the fluid operated type, final judgment adverse to the patentees was rendered Nov. 14, 1963, as to claims 1, 3, 4 and 6.

[*Official Gazette February 4, 1964.*]